US010585186B2

(12) United States Patent
Cornic et al.

(10) Patent No.: US 10,585,186 B2
(45) Date of Patent: Mar. 10, 2020

(54) ANTICOLLISION RADAR, ESPECIALLY FOR AN AIRCRAFT WHEN TAXIING, AND ANTICOLLISION SYSTEM

(71) Applicant: THALES, Courbevoie (FR)

(72) Inventors: Pascal Cornic, Guilers (FR); Patrick Le Bihan, Lannilis (FR); Yves Audic, Brest (FR)

(73) Assignee: THALES, Courbevoie (FR)

( * ) Notice: Subject to any disclaimer, the term of this patent is extended or adjusted under 35 U.S.C. 154(b) by 616 days.

(21) Appl. No.: 15/034,371

(22) PCT Filed: Nov. 7, 2014

(86) PCT No.: PCT/EP2014/074056
§ 371 (c)(1),
(2) Date: May 4, 2016

(87) PCT Pub. No.: WO2015/078682
PCT Pub. Date: Jun. 4, 2015

(65) Prior Publication Data
US 2016/0259048 A1 Sep. 8, 2016

(30) Foreign Application Priority Data
Nov. 26, 2013 (FR) ...................................... 13 02731

(51) Int. Cl.
*G01S 13/93* (2006.01)
*G01S 13/90* (2006.01)
(Continued)

(52) U.S. Cl.
CPC .......... *G01S 13/931* (2013.01); *G01S 13/343* (2013.01); *G01S 13/90* (2013.01); *G01S 13/9047* (2019.05); *G01S 2013/9335* (2013.01)

(58) Field of Classification Search
CPC .......... G01S 13/04; G01S 13/06; G01S 13/24; G01S 13/26; G01S 13/32; G01S 13/343;
(Continued)

(56) References Cited

U.S. PATENT DOCUMENTS 4,387,373 A * 6/1983 Longuemare, Jr. .........................
G01S 13/9023
342/149
4,713,669 A 12/1987 Shuch
(Continued)

FOREIGN PATENT DOCUMENTS

DE 103 10 214 A1 7/2004
EP 0 863 409 A1 9/1998
(Continued)

*Primary Examiner* — Bernarr E Gregory
*Assistant Examiner* — Daniel P Malley, Sr.
(74) *Attorney, Agent, or Firm* — Baker & Hostetler LLP (57) ABSTRACT

A radar attached laterally to airplane fuselage to detect obstacles on a collision course with a portion of the airplane facing the radar. The radar includes an emission antenna channel and reception antennal channels in the same plane. The radar Establishing in a radar coordinate system a first distance/Doppler map allowing echoes to be separated into distance and Doppler resolution cells in reception antennal channels; Establishing a second distance/Doppler map of smaller size by selecting a subset of distance/Doppler resolution cells corresponding to possible positions of targets liable to collide with the airplane; Establishing new distance/ Doppler maps by forming beams computationally from the subsets of distance resolution cells; and Temporal integration, in each beam, of successive distance/Doppler maps.

15 Claims, 10 Drawing Sheets

(51) Int. Cl.
*G01S 13/34* (2006.01)
*G01S 13/931* (2020.01)

(58) Field of Classification Search
CPC ...... G01S 13/345; G01S 13/449; G01S 13/50;
G01S 13/505; G01S 13/532; G01S 13/58;
G01S 13/581; G01S 13/583; G01S
13/584; G01S 13/588; G01S 13/589;
G01S 13/60; G01S 13/64; G01S 13/90;
G01S 13/9011; G01S 13/9035; G01S
13/9017; G01S 13/931; G01S 13/91;
G01S 13/913; G01S 2013/9035; G01S
2013/9047; G01S 2013/9094; G01S
2013/916; G01S 2013/9335; G01S
2013/9353; G01S 2013/9385
See application file for complete search history.

(56) References Cited

U.S. PATENT DOCUMENTS

| | | | | |
|---|---|---|---|---|
| 5,465,095 | A * | 11/1995 | Bryant | G01S 13/5244 342/159 |
| 6,809,681 | B1 * | 10/2004 | Niechayev | G01S 13/26 342/109 |
| 2003/0052813 | A1 * | 3/2003 | Natsume | G01S 7/354 342/70 |
| 2008/0100499 | A1 * | 5/2008 | Nishimura | G01S 7/03 342/75 |
| 2009/0174591 | A1 * | 7/2009 | Cornic | G01S 13/44 342/29 |
| 2010/0127915 | A1 * | 5/2010 | Klotzbuecher | G01S 13/584 342/112 |
| 2012/0050091 | A1 * | 3/2012 | Inami | G01S 13/931 342/107 |
| 2012/0169532 | A1 | 7/2012 | Yamada | |
| 2013/0002470 | A1 * | 1/2013 | Kambe | G01S 13/867 342/55 |
| 2015/0331098 | A1 * | 11/2015 | Luebbert | G01S 7/354 342/91 |
| 2015/0338505 | A1 * | 11/2015 | Oshima | G01S 7/28 342/107 |
| 2015/0369912 | A1 * | 12/2015 | Kishigami | G01S 13/26 342/113 |
| 2016/0223665 | A1 * | 8/2016 | Winstead | G01S 13/882 |

FOREIGN PATENT DOCUMENTS

| | | |
|---|---|---|
| EP | 1 002 920 A2 | 5/2000 |
| FR | 2 905 765 A1 | 3/2008 |
| FR | 2 913 775 A1 | 9/2008 |

* cited by examiner

ANTICOLLISION RADAR, ESPECIALLY FOR AN AIRCRAFT WHEN TAXIING, AND ANTICOLLISION SYSTEM

CROSS-REFERENCE TO RELATED APPLICATIONS

This application is a National Stage of International patent application PCT/EP2014/074056, filed on Nov. 7, 2014, which claims priority to foreign French patent application No. FR 1302731, filed on Nov. 26, 2013, the disclosures of which are incorporated by reference in their entirety.

FIELD OF THE INVENTION

The present invention relates to an anticollision radar, especially for taxiing aircraft. The invention relates to an anticollision system using at least two anticollision radars. More precisely, the invention is especially applicable to the detection of obstacles on the ground in order to prevent any collision between a taxiing aircraft and these obstacles.

BACKGROUND

Airport traffic is increasingly dense both in the air and on the ground. Collisions between aircraft and various obstacles on the ground are more and more frequent, especially when an aircraft is returning to a parking position from a runway of an airport. For example, with a wide-body aircraft it is difficult for the pilot of the aircraft to see the wings and jet engines. The wings and jet engines are therefore particularly exposed to impacts with various objects such as:

other aircraft
airport infrastructure; and
airport support vehicles.

This type of incident, in addition to the cost of repairing the aircraft, requires ground maintenance be carried out on the aircraft. This ground maintenance of the aircraft is financially detrimental to the company owning the aircraft.

To mitigate these collisional problems, airports are equipped with various means allowing centralized management of ground traffic. These means are especially airport surveillance radar, radio means, GPSs and transponders. However, the density of traffic in airports is such that these means are not enough to ensure the final guidance of aircraft to their parking position. In addition, these means are often ineffective when it is foggy for example and generally when meteorological conditions are bad or it is night. Human intervention is thus necessary in order to prevent any risk of the aircraft colliding with objects present on the ground in a taxiing zone.

Another way of avoiding collisions between an aircraft and objects present on the ground is to equip the aircraft with autonomous anticollision devices that complement existing means present in the airport. These anticollision devices especially make it possible to ensure the aircraft is protected over a very short distance with respect to stationary objects or objects possessing a low velocity of movement.

Among these means, devices including video cameras are especially used. Video cameras are however ineffective when meteorological conditions are poor. In addition, video-camera-based devices do not provide the pilot with precise information either on the distance between the aircraft and a potential obstacle, or on the relative velocity of the aircraft with respect to the obstacle.

To treat a wide angular field with a sufficient depth of field in a very short time, the video cameras may be equipped with zooms or rapid electronic focusing devices. The video cameras thus equipped are complex to implement and do not have the reliability required for an anticollision device.

Other devices based on the LIDAR (acronym for Light Detection And Ranging) may be used. Anticollision devices using LIDAR however have the same drawbacks as devices using video cameras.

Acoustic sensors may also be implemented in anticollision devices. Acoustic sensors are however very sensitive to interference and to perturbation of the propagation of the acoustic waves. All this makes the use of acoustic sensors difficult in an airport environment. The range of acoustic sensors is also too low, of about a few meters, to be suitable for an anticollision device.

Other anticollision devices use radar technologies such as ultra wideband radars. These devices run the risk of jamming other pieces of equipment such as the on-board navigation equipment of aircraft. Ultra wideband radars are therefore subject, when their use is permitted, to very restrictive regulations especially limiting the power of the emitted wave. The limitation of the emission power of these radars considerably decreases their field of use and especially their range. In addition, these radars do not possess, taken individually, an angular discrimination capacity. They therefore do not allow obstacles to be located with sufficient precision. Such radars possess attractive angular discrimination capacities only when they are grouped together into large arrays, thereby making implementation on-board an aircraft impossible.

Patent application FR 07 01927, having publication number 2 913 775, describes an effective solution for processing collision risk, in which a system of automotive radar sensors operating in the millimeters band is used.

This solution, although effective, may be subject, on account of the number of sensors implemented and their installation position, to both integration and cost constraints that make it difficult to implement on certain carriers.

SUMMARY OF THE INVENTION

One aim of the invention is especially to mitigate the aforementioned drawbacks. To this end, one subject of the invention is an anticollision radar for a taxiing machine, said radar being able to be attached laterally to the body of a machine and to detect obstacles on a collision course with a portion of the machine facing said radar; said radar includes at least one emission antennal channel emitting a wave of the FMCW type and a plurality of reception antennal channels placed in the same plane, the form of said wave and the field of angular coverage of said radar depending on the velocity of the machine, the processing means of said radar carrying out at least the following steps:

Establishing in the coordinate system of the radar a first distance/Doppler map allowing echoes to be separated into distance and Doppler resolution cells in said plurality of reception antennal channels;

Establishing a second distance/Doppler map of smaller size than the first by selecting from the latter a subset of distance and Doppler resolution cells corresponding to the possible positions of targets liable to collide with said portion of the machine, said selection depending on the velocity of the machine;

Establishing new distance/Doppler maps by forming beams computationally from the subsets of those distance resolution cells that are retained for each reception antennal channel, so as to separate the beam of angular observation in the plane of the antennal channels into at least two beams, in conformity with the principle of lobe sharpening by Doppler filtering in unfocused synthetic antenna processing; and Temporal integration, in each beam formed, of a plurality of successive distance/Doppler maps obtained in the preceding step in order to obtain a final distance/Doppler map for each beam, the integration duration depending on the waveform used;

these steps being followed by at least one step of detecting in each of the beams formed on the basis of said final distance/Doppler map.

In the detecting step, the azimuth angle of said target is for example estimated, for each detected pixel in the final distance/Doppler map, by comparing the received level in the distance/Doppler maps of two adjacent formed beams using an amplitude monopulse type operator.

The detecting step is for example followed by a step of tracking detected targets in the coordinate system of said radar.

The radar for example performs a step of changing locational coordinate systems, passing from the coordinate system associated with the radar to a coordinate system associated with said portion of the radar, in order to estimate the coordinates of the targets in the coordinate system associated with said portion.

The plane of the reception antenna channels is for example horizontal.

The beam forming may be carried out in an angular field of +/−45° in the plane of the antennal channels, relative to a sighting axis, able to be perpendicular to the axis of the body of the machine.

In one possible embodiment, the antennae of the reception antennal channels in which the beam forming is carried out computationally are spaced apart from one another by more than one half wavelength, the ambiguity in the angular position of a target being removed by the Doppler frequency of the distance/Doppler cell of said target.

The first distance/Doppler map is for example obtained after distance compressing and Doppler compressing said wave of the FMCW type.

In one particular embodiment, the reception system of the radar includes four antennal channels.

The radar for example operates in the millimeter domain. In one particular embodiment, it operates in the frequency band 76 to 77 GHz.

Advantageously, the machine may be an aircraft, said portion for example being a wingtip of the aircraft.

Another subject of the invention is an anticollision system for a taxiing airplane, said system including at least two radars such as described above, each installed laterally on one side of the fuselage.

In one possible embodiment, each radar is installed in front of the wing and for example attached in the location of a porthole in the vicinity of the cockpit.

BRIEF DESCRIPTION OF THE DRAWINGS

Other features and advantages of the invention will become apparent from the following description, which is given with regard to the appended drawings, which show.

DETAILED DESCRIPTION

Figure 1:
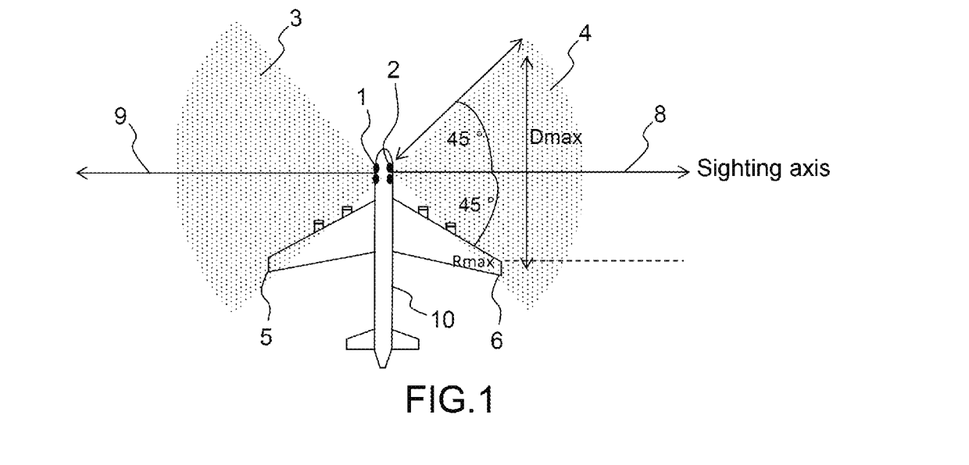
FIG. 1, an exemplary anticollision system according to the invention applied to a taxiing aircraft seen from above.

FIG. 1 illustrates an exemplary anticollision system according to the invention, installed on an airliner. This system especially makes it possible to avoid impacts with the tips of the wings and optionally with the jet engines.

The system is composed of two radar sensors 1, 2 according to the invention, which sensors are each installed laterally on one side of the fuselage of the airplane 10. The radars 1, 2 are oriented along a sighting axis 8, 9 substantially perpendicular to the axis of the fuselage so that their beams 3, 4 cover the zones located in front of the wing. Each radar is for example placed in the vicinity of the cockpit so as to detect obstacles on a collision course with the wingtips 5, 6. It may especially be installed in the location of a porthole. The processing according to the invention and which will be described below advantageously makes it possible to avoid having to place the radar on the ends of the wings. The same processing means that it is only necessary to install one radar per side of the fuselage. Each radar is autonomous and for example delivers warning information directly to the pilot, without needing to fuse the information from a plurality of radars.

The field of coverage of the radars is optimized to ensure obstacles are detected as far as possible from and continuously to as close as possible to the wingtip. Thus, a radar 1, 2 possesses a field that is wide in azimuth, for example of about 90°. More particularly, on account, on the one hand, of the installation geometry and, on the other hand, of the maximum angular aperture achievable for a static radar antenna, the angular coverage of the radar in the horizontal plane extends for example by +/−45° about the sighting axis 8, 9. Under these conditions, the wingtip is protected from a zero distance to a maximum distance Dmax, typically of about 90 meters, corresponding to the radar range Rmax of about 70 meters. On account of the braking distances required to stop the carrier, the anticollision system must for example be effective up to a velocity of about 10 meters/second.

Figure 2:
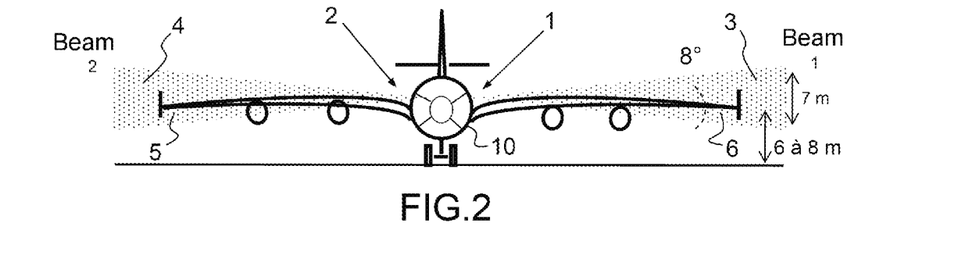
FIG. 2, the preceding system seen from in front of the aircraft.

FIG. 2 shows the radar beams 3, 4 in elevation. In the vertical plane, the angular aperture of the antenna of a radar 1, 2 and the direction of its beam are chosen to amply irradiate the wingtip while decreasing irradiation of the ground. Typically, for a distance between the radar and the wingtip of about 50 meters, a beam of aperture of about 8° in elevation pointed in the direction of the wingtip allows a vertical coverage of +/−3.5 meters centered on the wingtip to be obtained, this being a good compromise for large airplanes the height of the ends of the wings of which is comprised between 6 and 8 meters from the ground.

Figure 3:
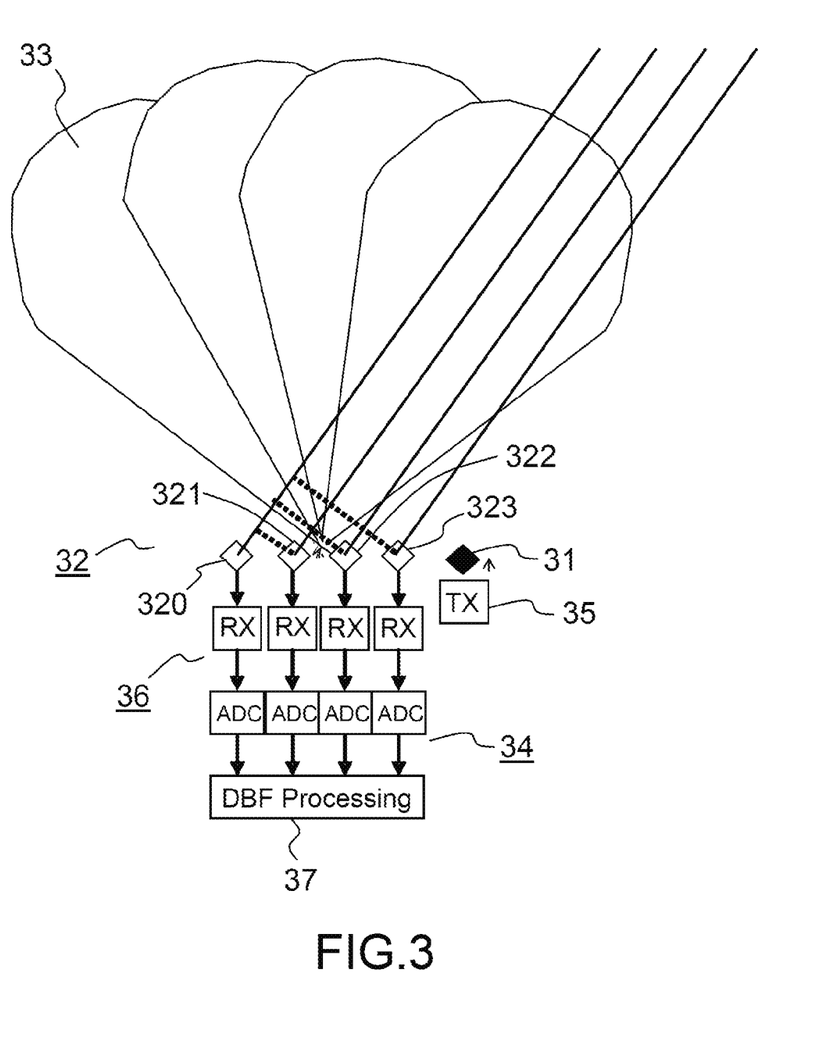
FIG. 3, a schematic diagram showing the principle of an exemplary radar according to the invention at the level of its reception and emission channels.

FIG. 3 schematically shows the principle of an anticollision radar 1, 2 according to the invention. The radar used may advantageously be a radar of the type described in patent application EP 0863409, operating for example at 77 GHz.

The radar comprises at least one emission antennal channel 31 and a plurality of reception antennal channels 32 preferably distributed in the same horizontal plane. In one possible embodiment, the radar includes one emission channel and four antennal channels 320, 321, 322, 323 as illustrated in FIG. 3. Thus the radar includes one emitter 35 and four receivers 36. Each reception channel includes an analog-digital converter 34, and the received and digitized signals are sent to a processor 37 that forms beams computationally. The antenna, which provides both the emission and reception antennal channels 31 and 32, may be a printed circuit board antenna. The antenna is produced in such a way that it covers a wide field in the horizontal plane, for example 90°, and a narrow field in the vertical plane, for example 8°.

The radar such as illustrated in FIG. 3 is capable of forming, by processing, four partially overlapping adjacent beams, each beam having an aperture of about 30° in the horizontal plane. This example typically corresponds to a situation in which the reception antennae are separated, in the horizontal plane, by a distance corresponding to one half wavelength, and in which four beams of about 30° aperture are formed every 30°, the entirety of the reception field covering about 120°.

The radar uses a FMCW (frequency modulation continuous-wave) waveform the characteristics of which are adapted depending on the needs of the airplane application, relative to the required resolution. So as to optimize both the ambiguity function of the radar and the signal-to-noise ratio for various collision hypotheses, the processing adapts the waveform to the current velocity of the carrier.

Figure 4:
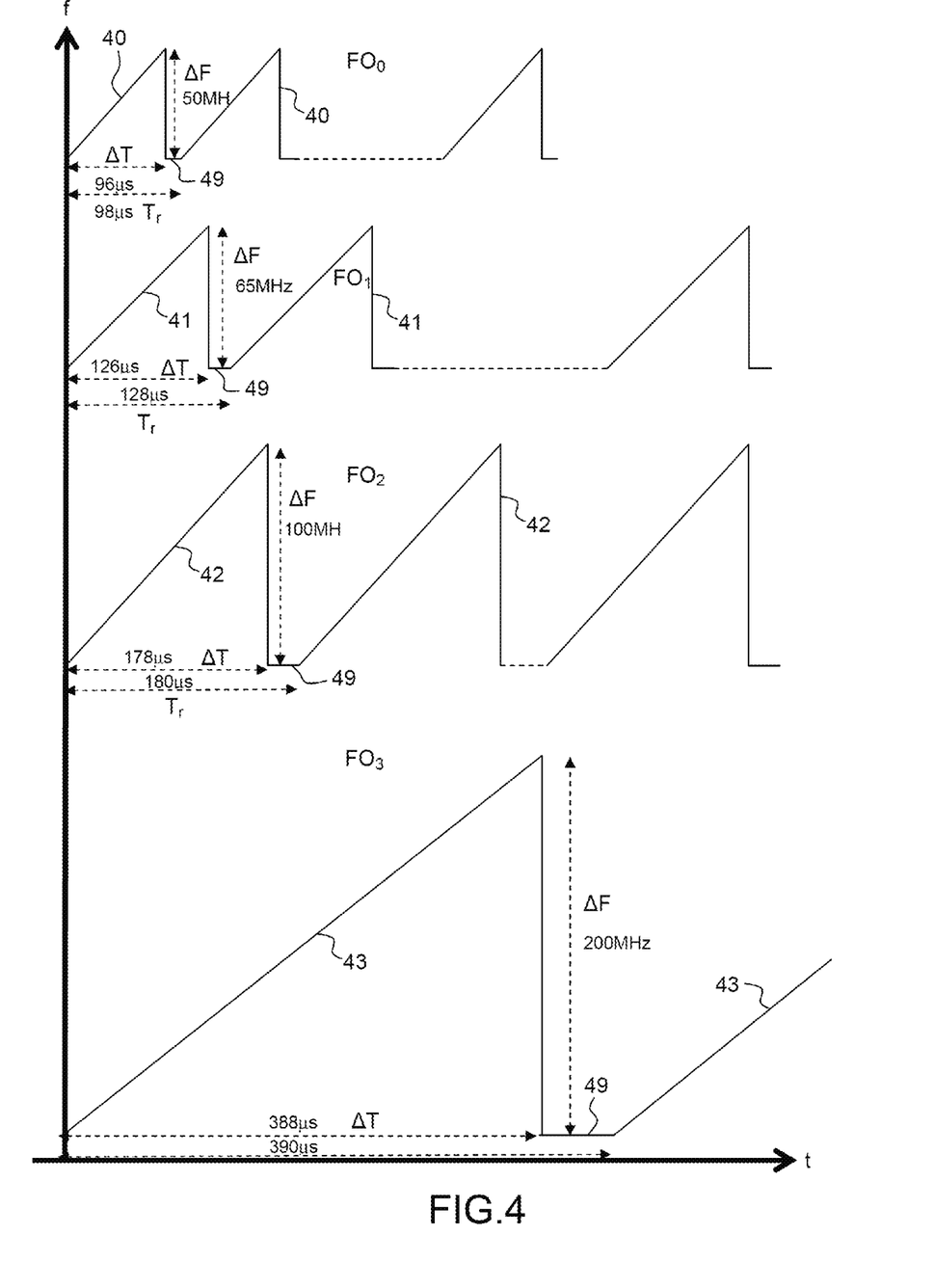
FIG. 4, an example of four waveforms used by a radar according to the invention depending on the velocity of the carrier.

FIG. 4 illustrates an exemplary embodiment of four waveforms $FO_0$, $FO_1$, $FO_2$ and $FO_3$ represented by curves 40, 41, 42, 43. Each curve expresses a linear variation in frequency as a function of time t over a period of recurrence Tr that is different for each of the waveforms, a duration of rest 49, during which the frequency is zero, being provided between each variation, especially in order to stabilize the reception loop. The period Tr is equal to the duration of the ramp of the waveform increased by the rest time 49. Likewise, the modulation amplitude of the ramp ΔF varies from one waveform to another.

According to the invention, the waveform of the radar is set to one of these forms $FO_0$, $FO_1$, $FO_2$, $FO_3$ depending on the velocity of the carrier. More particularly, the characteristics of the waveform depend on the velocity of the carrier, these characteristics being essentially the duration of the ramp ΔT and the modulation band ΔF. One example of four waveforms $FO_0$, $FO_1$, $FO_2$, $FO_3$ is given in the appendix.

At constant processing load, it is advantageous at high velocity, i.e. when detection at large distances is desired, to privilege the Doppler resolution of the radar to the detriment of distance resolution. In contrast, at low velocity, it is preferable to use a high distance resolution, separation by velocity not being very discriminate. This aspect will be described below with regard to processing operations carried out on the signal received by the radar.

Figure 5:
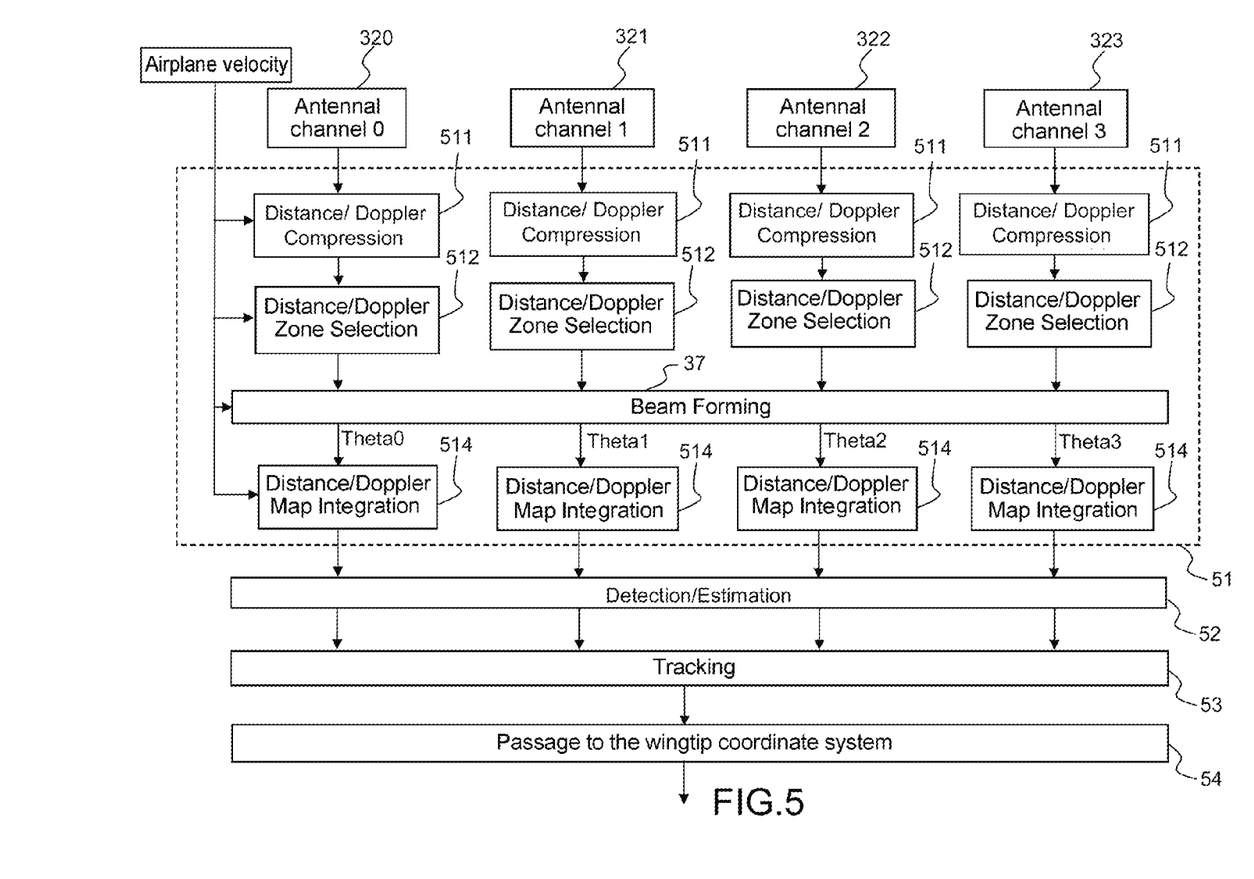
FIG. 5, possible steps implemented by the processing of a radar according to invention.

FIG. 5 illustrates the processing steps carried out by a radar according to the invention in the case of an embodiment comprising four reception channels. In a first phase 51, the processing decomposes the environment seen by each of the reception antennal channels 320, 321, 322, 323 along two axes, a distance axis and a Doppler axis, in order to form a first map of the phase-and amplitude-coded received signals. At the end of this first phase, the radar performs a detecting and locating step 52, then a tracking step 53 and lastly a step 54 of passing to a coordinate system associated with the wingtip.

In the first phase 51, the radar performs for each antennal channel a step 511 of distance and Doppler compressing, a step 512 of selecting a distance-Doppler zone, a computational beam forming step 37, then a step 514 of integrating the distance-Doppler map.

Figure 6:
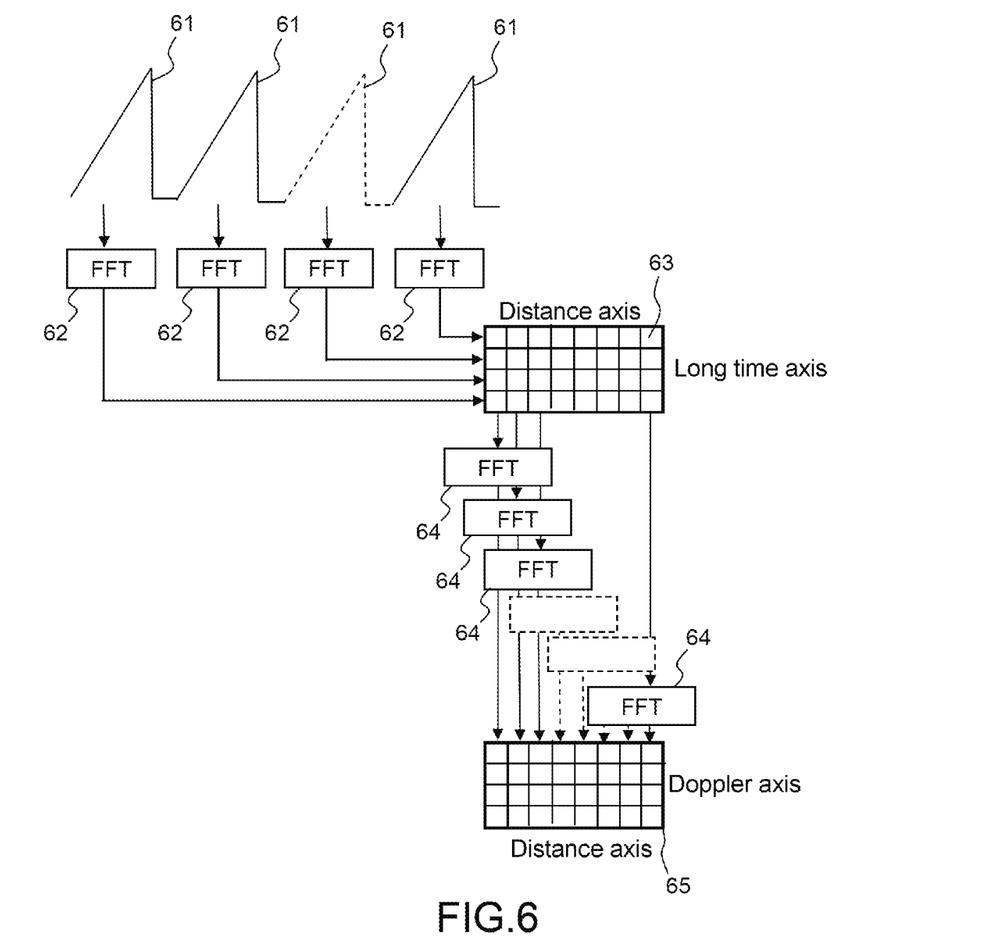
FIG. 6, the way in which a first distance/Doppler map is established.

FIG. 6 illustrates the distance and Doppler compression 511. This step makes it possible to establish, in the coordinate system of the radar, a distance/Doppler map allowing the echoes to be separated into distance and Doppler resolution cells, in the reception antennal channels distributed in the horizontal plane.

The compression is carried out after the signal received has been demodulated with the emission signal and encoded. The compression itself includes two steps. The first step consists in carrying out the distance compression by fast Fourier transform (FFT) 62 to a temporal depth $NFF_{CD}$ corresponding to the modulation duration of each of the frequency ramps 61. In each distance box 63 a distance value biased by the Doppler effect is obtained. The distance FFT of this first step are therefore followed in a second step by Doppler FFT to correct this bias.

The second step therefore allows the signal received in each of the distance boxes 63 thus formed to be analyzed by carrying out a second fast Fourier transform 64 to a temporal depth corresponding to a number $NFFT_{Dop}$ of successive ramps. At the end of this second step, for each reception antenna, a distance-Doppler map 65 that is $NFF_{CD} \times NFFT_{Dop}$ in size is obtained. The distance angular processing and the Doppler processing may be inverted, i.e. it is possible to start by carrying out the Doppler FFT and then the distance FFT.

Figure 7:
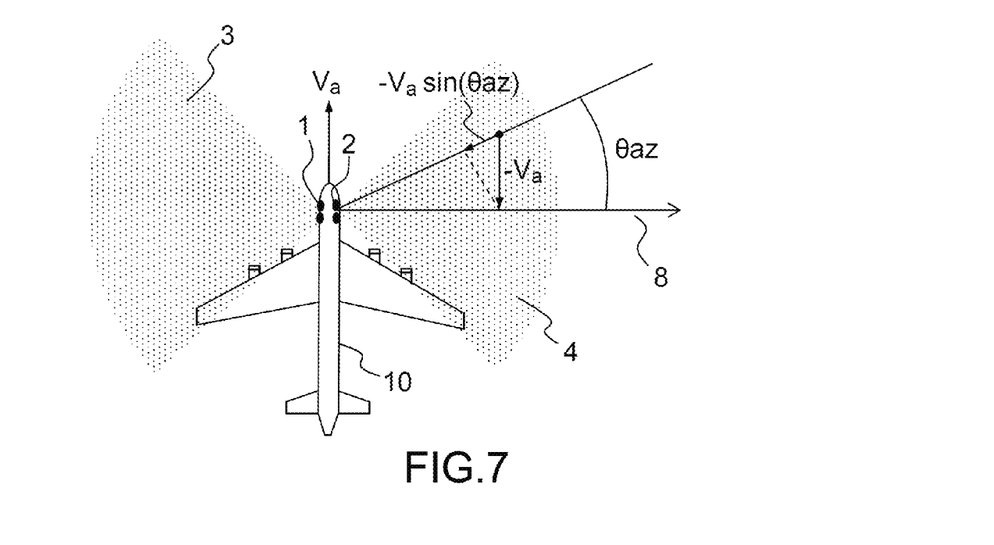
FIG. 7, an illustration of Doppler resolution.

The separation of the targets on the Doppler axis is used to separate the signals according to their direction of arrival, in conformity with the principle of lobe sharpening by Doppler filtering in unfocused synthetic antenna processing. Specifically, each of the columns of this distance-Doppler matrix 65 may be likened to echoes attached to a subbeam in a given azimuthal direction. FIG. 7 illustrates this Doppler resolution.

As FIG. 7 shows, provided that it is possible to neglect the elevation angle, this being the case in this application to a taxiing airplane, the radial velocity Vr of a fixed point located at an azimuth $\theta_{az}$ relative to the axis of the beam is written:

$$Vr = -Va \sin(\theta_{az}) \quad (1)$$

where Va is the longitudinal velocity of the taxiing airplane.

Therefore, its Doppler frequency is written:

$$Fd = -2\frac{Va}{\lambda}\sin(\theta_{az}) \quad (2)$$

where λ represents wavelength.

Two fixed points separated angularly by an angular deviation Δθaz generate two Doppler frequencies separated by:

$$\Delta Fd = 2\frac{Va}{\lambda}\cos(\theta_{az})\Delta\theta_{az}. \quad (3)$$

Thus, if the observation duration used for the calculation of the Doppler Fourier transform is Te=1/ΔFd.

Each column of the Doppler distance matrix 65 corresponds to the output of a subbeam typically of width $$\Delta\theta_{az} = \frac{\lambda}{2\ Va\ Te\ \cos(\theta_{az})} \quad (4)$$

centered on the azimuthal angle $$\theta_{az} = \arcsin\left(-\frac{\lambda Fd}{2Va}\right),$$

where Fd is the central frequency of the filter in question.

If a fixed point located at an azimuth $\theta_{az}$ and at a distance R from the radar is considered, the Fourier transform on the Doppler axis makes it possible to achieve a resolution in transverse distance:

$$r_t = \frac{\lambda R}{2\ Va\ Te\ \cos(\theta_{az})}. \quad (5)$$

For example, for:
λ=3.9 mm
R=40 m
Va=10 m/sec
Te=50 ms
θaz=0
a transverse resolution of $r_t$=15.6 cm is obtained.

In the choice of the waveform described above, the invention advantageously uses the fact that the angular resolution, which translates into a resolution in transverse distance as seen from the radar, is inversely proportional to the velocity of the carrier. In the case where the observed target is moving at a radial velocity Vro relative to the radar, the angular separation by Doppler filtering is unchanged, but because of the angle/velocity ambiguity, the direct estimation of the angle from the measurement of the Doppler frequency is biased because:

$$Fd = -2\frac{Va}{\lambda}\sin(\theta_{az}) + 2\frac{Vro}{\lambda} \quad (6)$$

and $$\theta_{azestim} = \arcsin\left(-\frac{\lambda Fd}{2Va} + \frac{Vro}{Va}\right), \quad (7)$$

where $\theta_{azestim}$ is the estimation of the azimuthal angle obtained directly from the measurement of the Doppler frequency Fd.

The Doppler compression therefore has the main objective of providing the radar with transverse resolution, radial resolution being obtained by the width of the emitted band.

The angular location must for its part be refined by a complementary means, assuming that it is desired to detect both static and moving targets. This is done by selecting a distance-Doppler zone.

Figure 8:
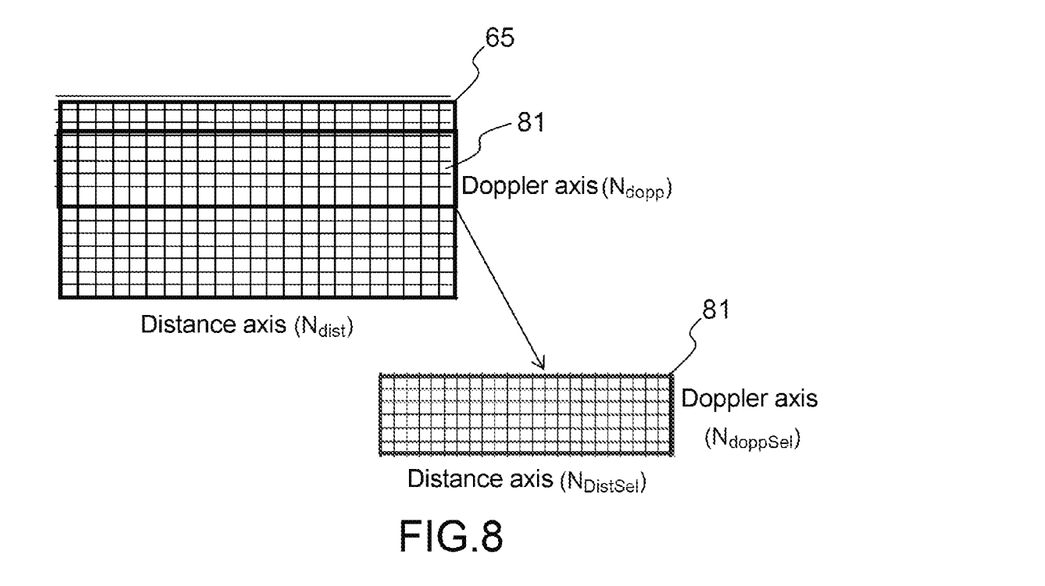
FIG. 8, the way in which a second distance/Doppler map of smaller size than the first is established.

FIG. 8 illustrates the selection of a distance-Doppler zone 512. In this step, the radar establishes a second map of smaller size than the first by selecting from the latter a subset of Doppler and distance resolution cells corresponding to the possible positions of any obstacles liable to collide with the wingtip.

As indicated above, in order to take advantage of the angular discriminating power of the Doppler axis to concentrate on certain angular zones and to limit computational power, a distance-Doppler zone of interest 81 is selected in this step 512. To select this zone, the processing takes into account the current velocity of the carrier with respect to a distance-Doppler zone of interest, this corresponding, as seen from the radar, to a limited distance swath and a limited angular field. Exemplary selection criteria are described below.

Only obstacles located, relative to the fuselage, at a lateral distance in the vicinity of the distance of the wingtip are liable to cause a collision, and must be taken into consideration.

For example, the extent of the zone of danger may be considered to extend plus or minus 10 meters on either side of the wingtip. This criteria makes it possible to define a minimum radar swath limiting the zone of processing on the radial distance axis, as seen from the radar.

Furthermore, on account of reaction time and braking distance, the minimum longitudinal detection distance relative to the wingtip for a first alarm level depends on the velocity of the carrier. Moreover, the radar processing requires a minimum number of successive detections to reliably detect the presence of an obstacle with a very low false alarm risk. These two constraints allow the upper distance limit of the detection zone to be determined, as seen from the wingtip. This limit is for example about 75 m for a velocity Va of 10 m/sec, and about 20 m for a velocity Va of 2.5 m/s.

It makes it possible to determine the first limit of the minimum detection angular field in the horizontal plane, as seen from the radar.

Lastly, it is necessary to continue to follow the position of the obstacle until a minimum distance corresponding to the braking distance is reached, in order to verify that said object remains on a collision course. This constraint allows the lower distance limit of the detection zone, as seen from the wingtip, to be determined.

This limit is typically 55 m at 10 m/sec and 10 m at 2.5 m/sec. It makes it possible to determine the second limit of the minimum detection angular field in the horizontal plane, as seen from the radar.

Figure 9A:
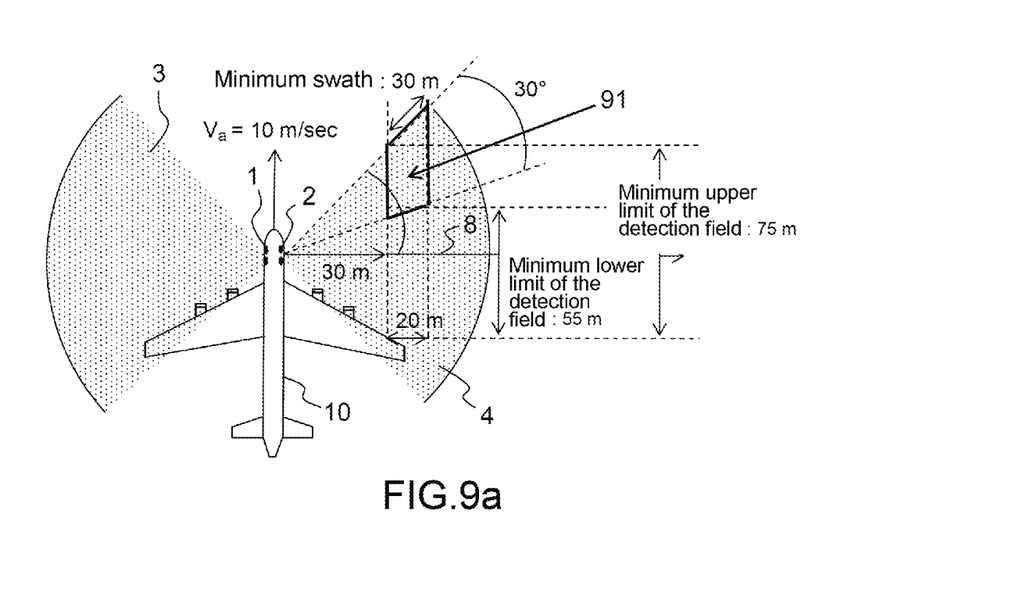
FIGS. 9a and 9b, illustrations of detection fields.
Figure 9B:
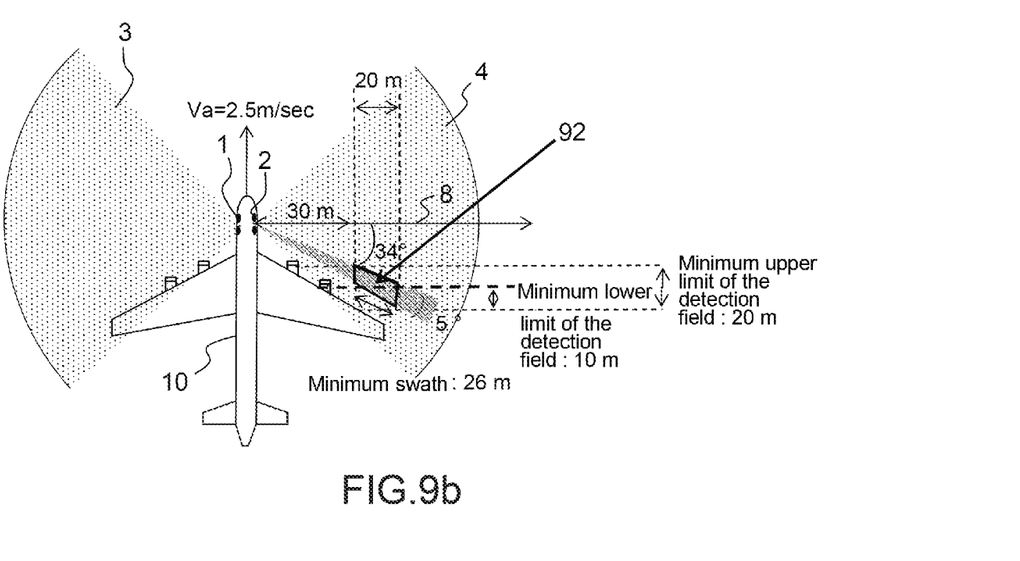

FIGS. 9*a* and 9*b* illustrate, by way of example, minimum surveillance fields corresponding to the aforementioned criteria, for detection limited to static objects. These figures show two opposed situations, FIG. 9*a* corresponding to a maximum velocity Va of 10 m/s and FIG. 9*b* to a minimum velocity of 2.5 m/s. In the example in FIG. 9*a*, the minimum detection field 91 covers an angular field of 30° with a minimum swath of 30 m, said field being oriented by about +45° relative to the sighting axis 8 and extending 10 meters on either side of the wingtip. The minimum lower limit of the detection field is 55 meters and the upper limit is 75 meters. In the example in FIG. 9*b*, the minimum detection field 92 covers an angular field of 5° with a minimum swath of 26 meters, said field being oriented by about −35° relative to the sighting axis 8 and extending 10 meters on either side of the wingtip. The minimum lower limit of the detection field is 10 meters and the upper limit is 20 meters. The values indicated with regard to FIGS. 9a and 9b are given by way of indication and example and may be optimized depending on the carrier and envisionable collision scenarios.

To these detection fields, defined by distance and azimuthal angle limits, correspond directly, for static obstacles, a limited distance and Doppler field in the distance-Doppler map. However, if detection of mobile obstacles is required, it is necessary to widen the Doppler field to take into account the contribution made by the radial velocity of these obstacles, in accordance with relationship (6). Moreover, if it is envisioned to detect mobile objects entering tardily into the field of view of the radar, it is also necessary to increase angularly the limits of the detection field. Thus, according to the invention, the limits of the Doppler field are established depending on the velocity of the carrier 10, for example using the table below.

| Velocity of the carrier | Limits of the angular field relative to the sighting axis 8 | Velocity field to consider | Doppler field to consider |
| --- | --- | --- | --- |
| 7.5 to 10 m/s | 0° to 45° | −10 m/s to 0 m/s | −4 KHz to 0 KHz |
| 5 to 7.5 m/s | −35° to 45° | −10 m/s to 4.3 m/s | −3 KHz to 2.1 KHz |
| 2.5 to 5 m/s | −45° to 10° | −5.4 m/s to 3.5 m/s | −2.1 KHz to 1.7 KHz |
| 0 to 2.5 m/s | −45° to 0° | −5.4 m/s to 1.8 m/s | −2 KHz to 0.9 KHz |

The limits of the distance field extend from 30 meters to 70 meters, whatever the velocity of the carrier 10.

The following step 37 is the step of forming azimuthal beams. In this step, the radar therefore establishes new distance/Doppler maps by forming beams computationally from the subsets of those distance resolution cells that are retained for each antennal channel, so as to separate the beam of angular observation in the horizontal plane into a plurality of, at least two, subbeams. The processing of the preceding steps 511, 512 was carried out independently on each of the four reception channels, up to this step of forming beams computationally. In this step, the processing means of the radar focus, by coherent integration on reception, the radar beam in a plurality of different directions in the distance-Doppler maps constructed beforehand, one map corresponding to each reception channel. This operation may be carried out by the operator defined by the following relationship (8) on each of the pixels (i, j) of the input distance-Doppler maps:

$$'S_{i,j}(\theta) = \sum_{k=0}^{N_{ant}-1} s(i,j) e^{2j\pi \frac{\delta d}{\lambda} k \sin\theta az}$$ (8)

where:
$N_{ant}$: the number of reception antennae
$\delta d$: the distance between each pair of elementary antennae
$\lambda$: the wavelength
$\theta_{az}$: the direction in which the beam is formed
i, j: the indices of the pixels along the Doppler axis (i) and distance axis (j)

s(i, j): the signal in amplitude and phase of the distance/Doppler box i, j.

For example, in the exemplary embodiment with 4 reception channels, the beams may typically be formed in the directions: $\theta_{az}=+45°$, $\theta_{az}=+15°$, $\theta_{az}=-15°$ and $\theta_{az}=+45°$, from four distance Doppler maps.

This processing thus delivers four distance/Doppler maps 81 that are ($N_{doppSel}$, $N_{distSel}$) in size in each of the aforementioned directions.

Figure 10A:
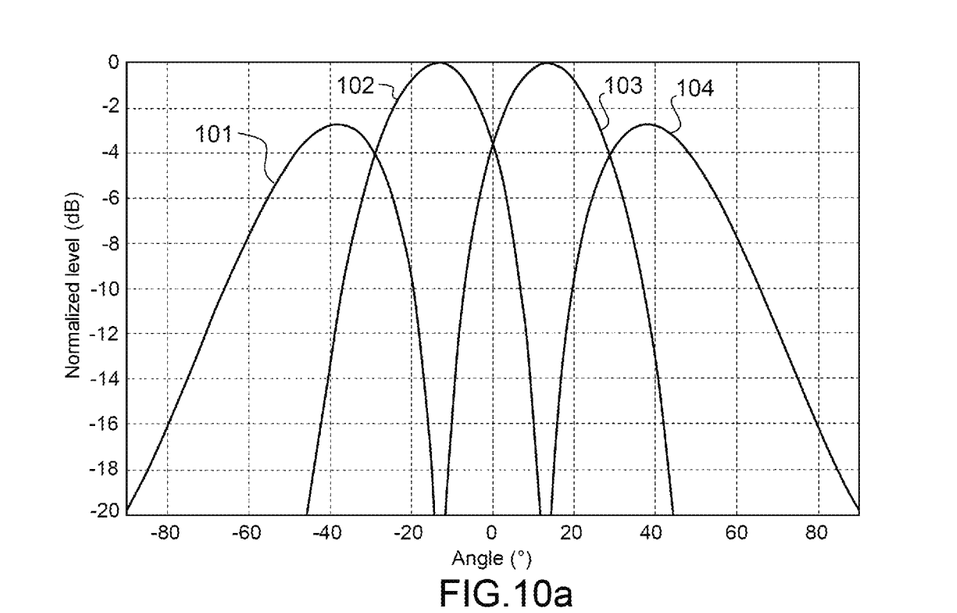
FIGS. 10a and 10b, examples of beam forming.

FIGS. 10a and 10b illustrate examples of beam forming. FIG. 10a corresponds to an embodiment comprising four reception channels in which the separation between each reception antennae in the horizontal plane is $\lambda/2$. In this case, four beams 101, 102, 103, 104 are formed with a width of about 30° and have no ambiguity. It will be noted that the pattern of the elementary reception antennae tend to deflect the beams formed. Specifically, the resulting pattern is defined by the directivity of the array, weighted by the elementary pattern defined by the aperture of the elementary subarrays. Since this bias is predictable, it is possible either to take this effect into consideration when forming the beams in order to position them correctly, or to compensate for this bias a posteriori during the angular estimation of the detected objects.

Figure 10B:
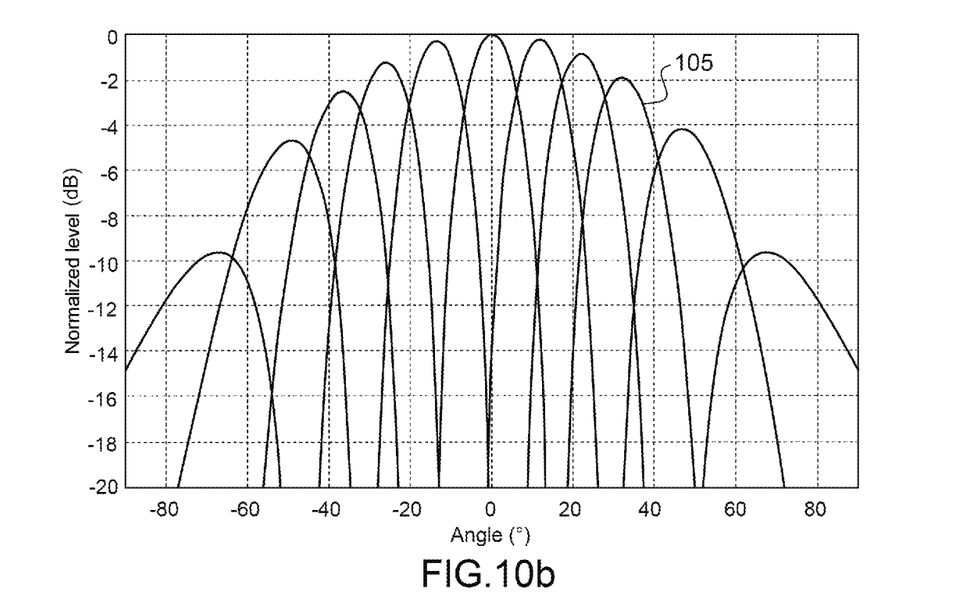

By virtue of the processing carried out by a radar according to the invention, it is also possible to improve the resolution of the reception beams including in the case of large deflections, by spacing the reception antennae by a distance larger than $\lambda/2$, this not usually being possible because of the presence of grating lobes that tend to cause large deflections to appear in detections located in the sector opposite their actual position relative to the axis of the antenna. This situation is shown in FIG. 10b in which 11 beams 105 are illustrated. Specifically, for an object on a collision course with the wing of the aircraft, the sign of the velocity, corresponding to whether the obstacle is getting closer to or moving further away from the radar, makes it possible without ambiguity to localize the detection on the left or right side of the axis of the antenna. For any obstacle on a collision course, the sign of the Doppler frequency therefore makes it possible to remove any left/right ambiguity that could be generated by an antenna ambiguous pattern with lobes.

Figure 11:
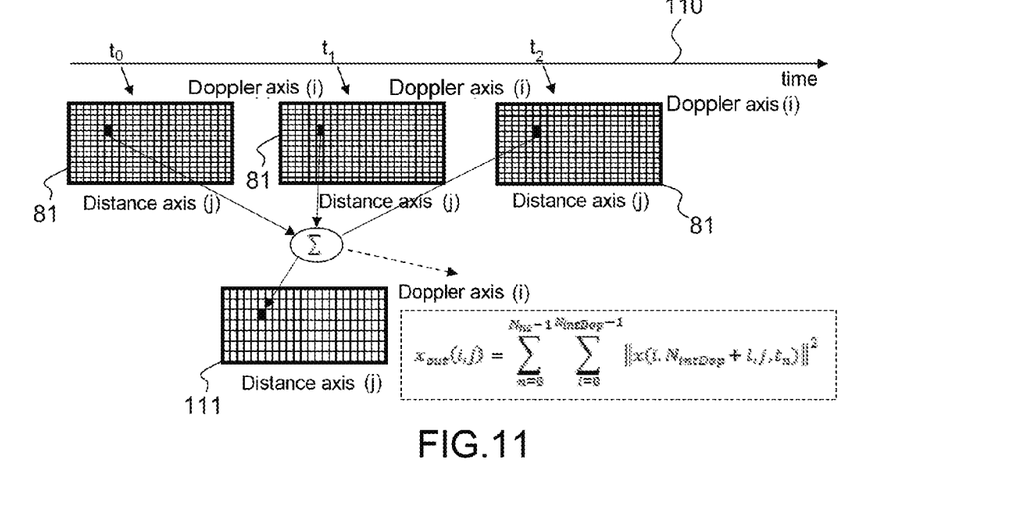
FIG. 11, an illustration of a step of integrating a distance/Doppler map.

FIG. 11 illustrates the step of integrating the distance-Doppler map. More particularly, this step 514 performs a temporal integration of a plurality of successive distance/Doppler maps obtained in each beam formed in the preceding step, adapted to targets on a collision course.

One objective of this step 514 is especially to increase the signal-to-noise ratio by non-coherent temporal integration of the distance-Doppler images issued from the preceding step, i.e. in each of the sighting directions. More particularly, FIG. 11 illustrates the non-coherent integration principle used to integrate the distance-Doppler maps.

The integration is carried out on each of the distance and Doppler axes of each map 81, while taking account, during the integration time, of possible distance and Doppler migrations, and while limiting the integration to the temporal movements of pixels possibly corresponding to collision courses:

On the Doppler axis: Each (i, j) output pixel is obtained by non-coherent integration of $N_{intDopp}$ Doppler pixels located in a given distance box of the input map, where $N_{intDopp}$ is chosen depending on the maximum Doppler migration during the integration time. In other words, an integration time is set and the number of filters the Doppler target possibly moves is observed.

It is moreover also possible at this level to limit the integration solely to pixels that have a predefined signal-to-noise ratio that is judged to be enough to correspond to a presumption of presence of a useful signal.

On the time axis: All the pixels of the distance/Doppler maps issued from the preceding step are summed non-coherently to a temporal depth defined by a parameter $N_{NC}$.

This summation may optionally be a rolling summation.

An output pixel $x_{out}(i, j)$ is thus obtained by non-coherent integration according to the following relationship (9):

$$x_{out}(i, j) = \sum_{n=0}^{N_{nc}-1} \sum_{l=0}^{N_{intDop}-1} \|x(i, N_{intDop}+l, j, t_n)\|^2$$

where:
i: index on the Doppler axis
j: index on the distance axis
n: index on the time axis 110

The duration of the non-coherent integration may be 250 ms to 300 ms depending on the waveform used.

The numerical values applied to the two parameters $N_{NC}$ and $N_{intDop}$ are for example the following $N_{NC}$=5 (i.e. 250 ms of non-coherent integration);

$N_{intDopp}$ depends on the current waveform and varies in accordance with the following table:

| Waveform | Number of integration boxes ($N_{intDOP}$) on the Doppler axis | Angular resolution (function of $V_a$) [$\Delta_{cross}$ 70 m] | Number of Doppler boxes in the output map |
|---|---|---|---|
| $FO_0$ | 10 | [2°, 3°] [3 m, 4 m] | 26 |
| $FO_1$ | 8 | [1.8°, 2.7°] [2.2 m, 3.2 m] | 50 |
| $FO_2$ | 2 | [0.8°, 1.8°] [1 m, 2 m] | 102 |
| $FO_3$ | 1 | [0.9°, 4°] [1 m, 5.4 m] | 88 |

In the very high-resolution case corresponding to the last row of the first column, $N_{intDopp}$=1 is obtained because no Doppler migration is possible and the target cannot change Doppler filter. In the first row of the third column, a number of Doppler boxes equal to 26 is obtained, this number being related to the angular resolution (here between 2° and 3°) and corresponding to the resolution. One filter corresponds to one given direction. In this case, there are 26 filters of interest for an angular resolution comprised between 2° and 3°.

At the end of this processing, a distance-Doppler map 111 is obtained for each sighting direction, corresponding to each beam formed.

The following steps 52, 53, 54 consist in detecting then in characterizing objects present in the processed field, in terms of distance, velocity and angular position.

The first 52 of these steps consists in detecting, in each of the beams formed, the presence of a possible target. The detection is carried out in a conventional way, by comparing each pixel relative to noise, this comparison optionally being completed by validation of a criterion of contrast with neighboring pixels or detection of outlines in the distance Doppler maps 111 issued from the preceding processing steps. This operation is carried out for each beam formed.

Figure 12:
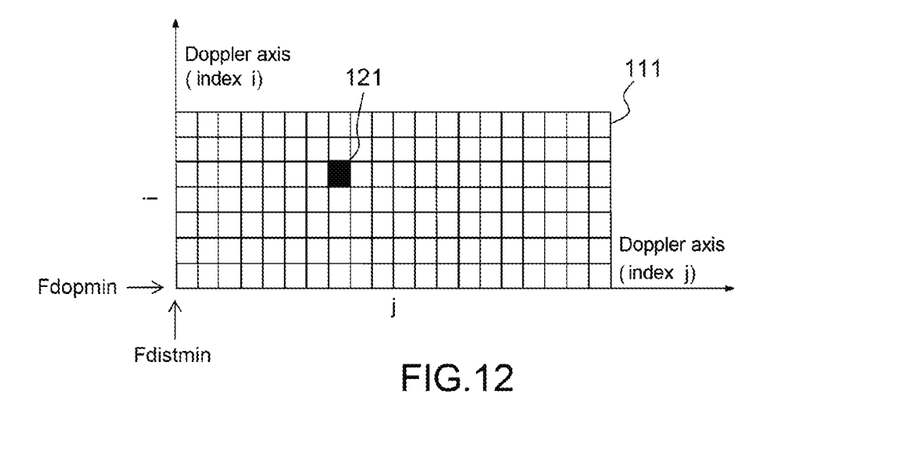
FIG. 12, an illustration of a step of detecting and estimating the position and velocity of a target.

The velocity and location of useful targets are estimated in a conventional way in the following steps:

For each pixel of indices i, j (see FIG. 12) giving rise to a detection:

The composite distance Doppler frequency $F_{dist}$ is estimated:

The index i of the pixel giving rise to a detection is extracted in order to identify the central frequency of the distance cell 121, and the measurement is refined by an estimation of contrast with adjacent pixels on the distance axis.

The Doppler frequency $F_{dop}$ is estimated:

The index j of the pixel giving rise to a detection is extracted in order to identify the central frequency of the distance cell 121, and the measurement is refined by an estimation of contrast with adjacent pixels on the Doppler axis.

The radial distance Drad is estimated using the following relationship (10):

$$Drad = (Fdist - Fdop)\frac{C\Delta Tm}{2\Delta Fm}$$

where:
$\Delta T_m$ is the duration of the ramp of the waveform of index m; and
$\Delta F_m$ is the modulation band of the ramp of index m.

In the example of the four waveforms in FIG. 4, details of which are given in the appendix, m varies from 0 to 4, with:
$\Delta T_0$=96 µs, $\Delta T_1$=126 µs, $\Delta T_2$=178 µs and $\Delta T_3$=388 µs; and
$\Delta F_0$=50 MHz, $\Delta F_1$=65 MHz, $\Delta F_m$=50 MHz, $\Delta F_2$=100 MHz and $\Delta F_3$=200 MHz.

Thus the radial distance echoes are rectified and bias associated with the Doppler shift corrected, hence the composite frequency term dependent on distance and Doppler shift.

In the example in FIG. 4, there are four waveforms $FO_0$, $FO_1$, $FO_2$ and $FO_3$, m here varying from 0 to 3.

Azimuthal angle is estimated

Advantageously, the azimuthal angle is estimated for each detected pixel by comparing the received level in the distance/Doppler maps of two adjacent formed beams, for example using a known amplitude monopulse type operator.

Figure 13:
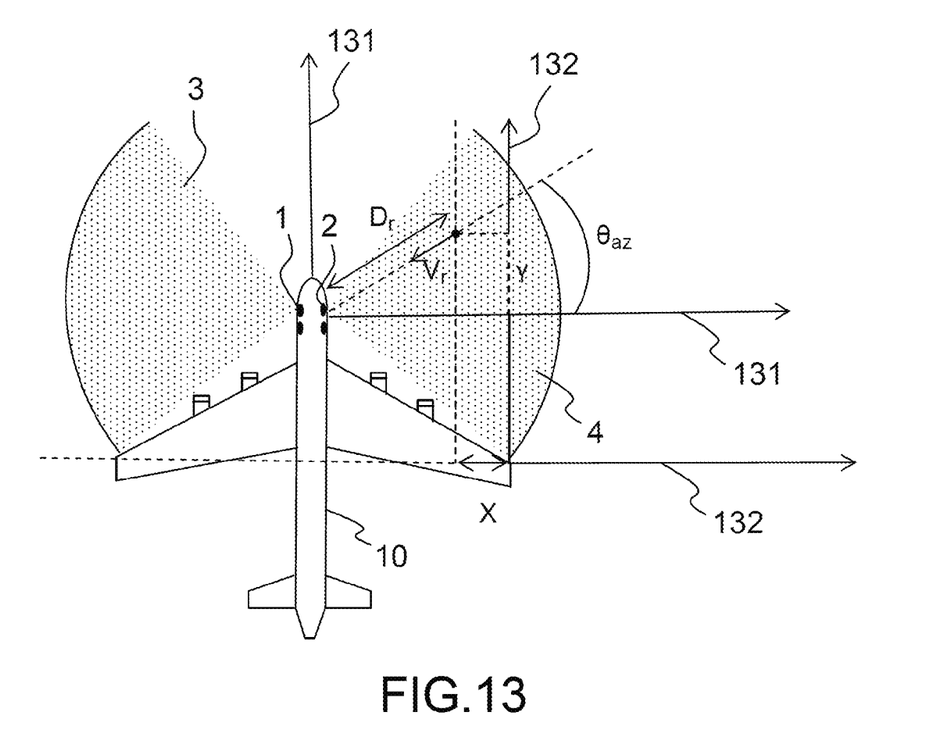
FIG. 13, an illustration of the passage from one coordinate system associated with a radar to a coordinate system associated with the tip of an airplane wing.

The detecting and locating step 52 is for example followed by a tracking step 53. The tracking is achieved by known processing in the coordinate system 131 of the radar. The targets are tracked so as to consolidate the detections, to refine their obtained velocity and position measurements, and to estimate their paths.

In a following step 54 a change of coordinate system is carried out, passing from the coordinate system 131 associated with the radar to the coordinate system 132 associated with the wingtip of the airplane as illustrated in FIG. 13. This change of coordinate system is carried out so as to position potential obstacles relative to the wingtip.

At this stage, only detections on a collision course are for example retained. The paths positioned in this new coordinate system may then be exploited by the anticollision system in order to be displayed and/or allow a pre-alarm or urgent alarm decision to be taken.

The invention was described for anticollision relative to the wingtips of a taxiing airplane. It also applies to any other portion of airplanes provided that they are located facing the radar.

Lastly, the invention may also apply to a taxiing machine other than an aircraft. The description relating to the fuselage of the airplane then applies to the body of the machine. In particular, the invention may advantageously be applied to taxiing machines with large wingspans, in order to prevent them colliding with various potential obstacles.

APPENDIX

This appendix presents a guide example of choices for the waveforms in FIG. 4.
Waveform $FO_0$: applied for $V_a$ comprised between 7.5 and 10 m/s
$\Delta F$=50 MHz in order to obtain a resolution of 3 m;
$\Delta F_{dopp}$=8 kHz considering the entirety of the beam (100°);
$F_r$=1.3 $\Delta F_{dopp}$=10.2 kHz ($T_r$=98 μs) to respect the constraint $F_{rec}$>$\Delta F_{dopp}$;
$\Delta T$=$T_r$-2 μs=96 μs; loop stabilization rest time
$F_{ech}$=625 kHz ($T_{ech}$=1.6 μs), the maximum sampling frequency of the radar;
In this case, the distance of ambiguity is located at 90 m.
Velocity field at −3 dB (100°): −7.7 m/s, 7.7 m/s
Angular resolution: [0.22°, 029°] where $$\theta_{res} = 2\arcsin\left(\frac{\lambda}{4 \cdot T_{int} V_r \cdot \sin\theta_{sq}}\right),$$

and $T_{int}$=50 ms
Namely a transverse resolution at 70 m of [0.27 m, 0.35 m]
Waveform $FO_1$: applied for $V_a$ comprised between 5 and 7.5 m/s
$\Delta F$=65 MHz in order to obtain a resolution of 2.3 m;
$\Delta F_{dopp}$=6 kHz considering the entirety of the beam (100°);
$F_r$=1.3 $\Delta F_{dopp}$=7.6 kHz ($T_r$=128 μs) to respect the constraint $F_{rec}$>$\Delta F_{dopp}$;
$\Delta T$=$T_r$-2 μs=126 μs; loop stabilization rest time;
$F_{ech}$=625 kHz ($T_{ech}$=1.6 μs), the maximum sampling frequency of the radar;
In this case, the distance of ambiguity is located at 90 m.
Velocity field at −3 dB (100°): −5.7 m/s, 5.7 m/s
Angular resolution: [0.29°, 0.44°]
Namely a transverse resolution at 70 m of [0.35 m, 0.53 m]
Waveform $FO_2$: applied for $V_a$ comprised between 2.5 and 5 m/s
$\Delta F$=100 MHz in order to obtain a resolution of 1.5 m;
$\Delta F_{dopp}$=4 kHz considering the entirety of the beam (100°);
$F_r$=1.3 $\Delta F_{dopp}$=5.5 kHz ($T_r$=180 μs) to respect the constraint $F_{rec}$>$\Delta F_{dopp}$;
$\Delta T$=$T_r$-2 μs=178 μs; loop stabilization rest time;
$F_{ech}$=625 kHz ($T_{ech}$=1.6 μs), the maximum sampling frequency of the radar;
In this case, the distance of ambiguity is located at 83 m.
Velocity field at −3 dB (100°): −4.2, +4.2 m/s
Angular resolution: [0.4°, 0.9°]
Namely a transverse resolution at 70 m of [0.5 m, 1.1 m]
Waveform $FO_3$: applied for $V_a$ lower than 2.5 m/s
$\Delta F$=200 MHz in order to obtain a resolution of 0.75 m;
$\Delta F_{dopp}$=2 kHz considering the entirety of the beam (100°);
$F_r$=1.3 $\Delta F_{dopp}$=2.56 kHz ($T_r$=195 μs) to respect the constraint $F_{rec}$>$\Delta F_{dopp}$;
$\Delta T$=$T_r$-2 μs=388 μs; loop stabilization rest time;
$F_{ech}$=625 kHz ($T_{ech}$=1.6 μs), the maximum sampling frequency of the radar;
In this case, the distance of ambiguity is located at 90 m.
Velocity field at −3 dB (100°): −2, +2 m/s
Angular resolution: [0.90°, 5°]
Namely a transverse resolution at 70 m of [1.1 m, 6.1 m]

The invention claimed is:
1. An anticollision radar for a taxiing aircraft, wherein the anticollision radar is attached laterally to a body of an aircraft to detect obstacles on a collision course with a portion of the aircraft, the anticollision radar being oriented along a sighting axis perpendicular to an axis of a fuselage of the aircraft;
   the anticollision radar including at least one emission antenna channel emitting a wave of a FMCW (frequency modulation continuous-wave) type and a plurality of reception antenna channels placed in a same plane, a form of said wave and a field of angular coverage of said anticollision radar depending on a velocity of the aircraft;
   said anticollision radar processing at least the following steps:
   establishing in a coordinate system of the anticollision radar a first distance/Doppler map allowing echoes to be separated into distance and Doppler resolution cells in said plurality of reception antenna channels;
   establishing a second distance/Doppler map of smaller size than the first distance/Doppler map by selecting from the first distance/Doppler map a subset of distance and Doppler resolution cells corresponding to positions of targets liable to collide with said portion of the aircraft, said selection depending on the velocity of the aircraft;
   establishing new distance/Doppler maps by forming beams computationally from subsets of the distance/Doppler resolution cells that are retained for each reception antenna channel, so as to separate a beam of angular observation in a plane of the antenna channels into at least two beams utilizing Doppler filtering in unfocused synthetic antenna processing;
   temporal integration, in each beam formed, of a plurality of successive distance/Doppler maps obtained in the establishing new distance/Doppler maps step in order to obtain an integrated distance/Doppler map for each beam, an integration duration depending on a waveform used; and
   at least one step of detecting in each of the beams formed on a basis of said integrated distance/Doppler map.

2. The anticollision radar as claimed in claim 1, wherein in the detecting step, an azimuth angle of a target is estimated, for each detected pixel in the integrated distance/Doppler map, by comparing a received level in the distance/Doppler maps of two adjacent formed beams using amplitude-comparison monopulse.

3. The anticollision radar as claimed in claim 1, wherein the detecting step is followed by a step of tracking detected targets in the coordinate system of said anticollision radar.

4. The anticollision radar as claimed in claim 1, wherein the anticollision radar changes coordinate systems, passing from the coordinate system associated with the anticollision radar to a coordinate system associated with said portion of the aircraft, in order to estimate coordinates of targets in the coordinate system associated with said portion, which positions said targets relative to said portion of the aircraft.

5. The anticollision radar as claimed in claim 1, wherein a plane of the reception antenna channels is a horizontal plane.

6. The anticollision radar as claimed in claim 1, wherein a beam forming by the antenna channels comprises an angular field of +/−45° in the plane of the antenna channels, relative to a sighting axis, that is perpendicular to an axis of the body of the aircraft.

7. The anticollision radar as claimed in claim 1, wherein antennae of the reception antenna channels in which the beam forming is carried out computationally are spaced apart from one another by more than one half wavelength, and wherein an ambiguity to localize a target being removed by a Doppler frequency of a distance/Doppler cell of said target.

8. The anticollision radar as claimed in claim 1, wherein the first distance/Doppler map is obtained after distance compressing and Doppler compressing said wave of the FMCW type.

9. The anticollision radar as claimed in claim 1, comprising four reception antenna channels.

10. The anticollision radar as claimed in claim 1, wherein said wave of the anticollision radar operates in a millimeter frequency domain.

11. The anticollision radar as claimed in claim 10, wherein said wave of the anticollision radar operates in a frequency band of 76 to 77 GHz.

12. The anticollision radar as claimed in claim 1, wherein said portion is a wingtip of the aircraft.

13. An anticollision system for a taxiing airplane, comprising at least two radars as claimed in claim 1, each installed laterally per side of the body of the airplane forming its fuselage.

14. The anticollision system as claimed in claim 13, wherein each radar is installed in front of a wing.

15. The anticollision system as claimed in claim 14, wherein each radar is attached in a location of a porthole in a vicinity of a cockpit.

\* \* \* \* \*